US012244756B2

(12) United States Patent
Daniel Marcelino Barbeira et al.

(10) Patent No.: US 12,244,756 B2
(45) Date of Patent: Mar. 4, 2025

(54) ON-DEMAND NETWORK CONNECTION

(71) Applicant: Truphone Limited, London (GB)

(72) Inventors: Jacinto Daniel Marcelino Barbeira, London (GB); Carlos Hugo Baptista Morgado, London (GB); David Alexandre Da Palma Simao, London (GB); Igor Borisoglebski, London (GB); Scott Mackenzie, London (GB); Michael Moorfield, London (GB); André Alves Rogério Santos, London (GB); João Afonso Vieira Casal, London (GB)

(73) Assignee: TRUPHONE LIMITED, London (GB)

( * ) Notice: Subject to any disclaimer, the term of this patent is extended or adjusted under 35 U.S.C. 154(b) by 420 days.

(21) Appl. No.: 17/720,157

(22) Filed: Apr. 13, 2022

(65) Prior Publication Data
US 2022/0239785 A1 Jul. 28, 2022

Related U.S. Application Data

(63) Continuation of application No. PCT/GB2020/052626, filed on Oct. 16, 2020.

(30) Foreign Application Priority Data

Oct. 16, 2019 (GB) .................................. 1914992

(51) Int. Cl.
*H04M 15/00* (2024.01)
*H04L 67/00* (2022.01)
(Continued)

(52) U.S. Cl.
CPC ........ *H04M 15/8228* (2013.01); *H04L 67/34* (2013.01); *H04W 8/22* (2013.01); *H04W 12/35* (2021.01); *H04W 12/72* (2021.01)

(58) Field of Classification Search
CPC ......... H04L 9/40; H04L 65/80; H04L 69/329; H04L 61/00; H04L 65/1101;
(Continued)

(56) References Cited

U.S. PATENT DOCUMENTS 9,325,941 B2 4/2016 Yang et al.
9,661,530 B2 5/2017 Sharma et al.
(Continued)

FOREIGN PATENT DOCUMENTS

CN 102316092 A 1/2012
CN 107852652 A 3/2018
(Continued)

OTHER PUBLICATIONS

United Kingdom Search Report dated Apr. 12, 2021 for GB Application No. GB1914992.1.
(Continued)

*Primary Examiner* — Golam Sorowar
(74) *Attorney, Agent, or Firm* — Whitestone Law, PLLC

(57) ABSTRACT

Methods for operating a communications-enabled application, controlling a secure profile via an operating system, and operating a cellular network are provided. Operating a communications-enable application includes detecting a need for data transmission when the mobile device has a communications status which is incompatible with the need and sending a request to activate a secure profile. Controlling the secure profile includes receiving a request from an application to have data session access via a secure profile and activating a data session utilising a secure profile. Operating the cellular network includes receiving a request to establish a cellular network data communications session from a mobile device including the communications-enabled application and establishing a data session with the mobile device using the secure profile. A mobile device and (Continued)

cellular network for performing the methods are also provided.

25 Claims, 9 Drawing Sheets

(51) Int. Cl.
*H04W 8/22* (2009.01)
*H04W 12/30* (2021.01)
*H04W 12/72* (2021.01)

(58) Field of Classification Search
CPC ............ H04L 1/0002; H04L 1/0025; H04L 1/0032; H04L 1/1671; H04L 1/1685; H04L 65/103; H04L 65/104; H04L 67/04; H04L 45/00; H04L 69/18; H04L 65/1069; H04L 12/14; H04L 45/48; H04L 1/0003; H04L 27/12; H04W 92/02; H04W 4/18; H04W 76/10; H04W 88/16; H04W 40/02; H04W 52/46; H04W 48/18; H04W 40/00; H04W 88/06; H04W 84/10; H04W 28/14; H04W 52/0261; H04W 52/04; H04W 52/38; H04W 72/12; H04W 76/14; H04W 76/22; H04W 8/005; H04W 4/00; H04W 8/18; H04W 88/02; H04W 80/04; H04W 4/24; H04W 88/182; H04W 12/06; H04M 15/00; H04M 7/006; H04M 1/2535; H04M 2250/14; H04M 15/745; H04M 15/80; H04M 2215/0108; H04M 2215/0152; H04M 15/44; H04M 2215/0104; H04M 15/49; H04M 15/8044; H04M 2215/42; H04M 2215/46; H04M 2215/745; H04M 15/41; H04M 15/43
See application file for complete search history.

(56) References Cited

U.S. PATENT DOCUMENTS

| | | | |
|---|---|---|---|
| 2010/0311468 A1 | 12/2010 | Shi et al. | |
| 2011/0093600 A1* | 4/2011 | Lee | H04W 48/18 709/228 |
| 2011/0306318 A1 | 12/2011 | Rodgers et al. | |
| 2013/0125205 A1* | 5/2013 | Hsu | H04W 88/06 726/3 |
| 2015/0017950 A1 | 1/2015 | Zhao et al. | |
| 2017/0142571 A1 | 5/2017 | Skög et al. | |
| 2019/0053185 A1* | 2/2019 | Shah | H04W 8/205 |
| 2019/0349338 A1* | 11/2019 | Frost | G06F 9/452 |
| 2021/0084485 A1* | 3/2021 | Roy | H04W 12/35 |
| 2022/0078289 A1* | 3/2022 | Karupanan Subramanian | H04M 15/58 |

FOREIGN PATENT DOCUMENTS

| | | |
|---|---|---|
| DE | 10311980 A1 | 9/2004 |
| EP | 3280111 A1 | 2/2018 |
| GB | 2473753 A | 3/2011 |
| JP | 2010532596 A | 10/2010 |
| JP | 2018518129 A | 7/2018 |
| JP | 2018207479 A | 12/2018 |
| WO | 2004082314 A2 | 9/2004 |

OTHER PUBLICATIONS

International Search Report and Written Opinion dated Feb. 2, 2021, for PCT Application No. PCT/GB2020/052626.

* cited by examiner

ON-DEMAND NETWORK CONNECTION

CROSS-REFERENCE TO RELATED APPLICATIONS

This application is a continuation of International Application No. PCT/GB2020/052626, filed Oct. 16, 2020 which claims priority to UK Application No. GB 1914992.1, filed Oct. 16, 2019, under 35 U.S.C. § 119(a). Each of the above referenced patent applications is incorporated by reference in its entirety.

BACKGROUND OF THE INVENTION

Field of the Invention

The present invention relates to telecommunications and wireless communication systems.

Description of the Related Technology

Generally, data communications-enabled applications installed on a mobile device, particularly, smart phones, require a data communications connection to function to their full extent. Without a data communications connection, a data communications-enabled application cannot offer a user its full capabilities.

Consider the case of a global taxi hailing application, it may need a data communications connection to on-demand broadcast its location and to request a taxi.

However, a mobile device may not always have an active data communications connection. For example, when a mobile device is abroad (such as when a user of the mobile device is travelling in a country outside of their home country) and, for any given reason, roaming on a foreign cellular mobile network is not enabled, or the device is not attached to a Wi-Fi network or some other applicable access network whereby to access the internet. Without the internet connection, a global taxi hailing communications-enabled application cannot fulfil its primary functionality.

Therefore, it is desired to more efficiently provide options to make full use of the capabilities of communications-enabled applications resident on mobile devices.

The prior art document U.S. Pat. No. 9,325,941 discloses a method to manage communication channels for communications-enabled applications in which a primary channel may use a first radio access technology such as Wi-Fi or cellular connectivity and a secondary channel may use a second radio access technology that is different from the first and data of the communications-enabled application may be transmitted over both the primary channel and the secondary channel in a concurrent or redundant fashion. The method described in U.S. Pat. No. 9,325,941 does not provide a solution to the above identified problem of lack of Wi-Fi network connection because it requires the usage of a first radio access technology such as Wi-Fi.

The prior art document U.S. Pat. No. 9,661,530 discloses a method in which a mobile device communicates with a cellular network over a cellular connection and a Wi-Fi network over a Wi-Fi connection and generates a plurality of statistics from backhaul data to generate backhaul statistics. Based on the plurality of statistics passing one or more thresholds, the mobile device may select the Wi-Fi connection for use in a communications-enabled application of the mobile device. This method does not solve the above identified problem seeing that it requires the usage of a Wi-Fi network over a Wi-Fi connection.

SUMMARY

According to a first aspect of the present disclosure, there is provided a method of operating a communications-enabled application on a mobile device, the method comprising: the application detecting a need for data transmission when the mobile device currently has a data communications status which is incompatible with the need; and the application sending a request to activate a secure profile for a cellular network data communications session.

According to a second aspect of the present disclosure, there is provided a method of controlling a secure profile via an operating system installed on a mobile device, the method comprising: receiving a request from an application installed on the mobile device, the request relating to authorisation of the application to have a cellular network data communications access via a secure profile; and activating a cellular network data communications session by utilising a secure profile.

According to a third aspect of the present invention, there is provided a mobile device comprising memory circuitry arranged to store an operating system and an application; and processing circuitry which, when configured with the operating system and/or the application, is arranged to perform methods according to the first and second aspects.

According to a fourth aspect of the present disclosure, there is provided a method of operating a cellular network for providing cellular network data communications to a mobile device, the method comprising: the cellular network receiving a request to establish a cellular network data communications session from a mobile device implementing the methods described with respect to the first and second aspects; and the cellular network establishing a cellular network data communications session with the mobile device using a secure profile included in the mobile device.

According to a fifth aspect of the present disclosure there is provided a cellular network arranged to perform a method according to the fourth aspect.

Further features and advantages of the invention will become apparent from the following description of preferred embodiments of the invention, given by way of example only, which is made with reference to the accompanying drawings.

DETAILED DESCRIPTION

Figure 1:
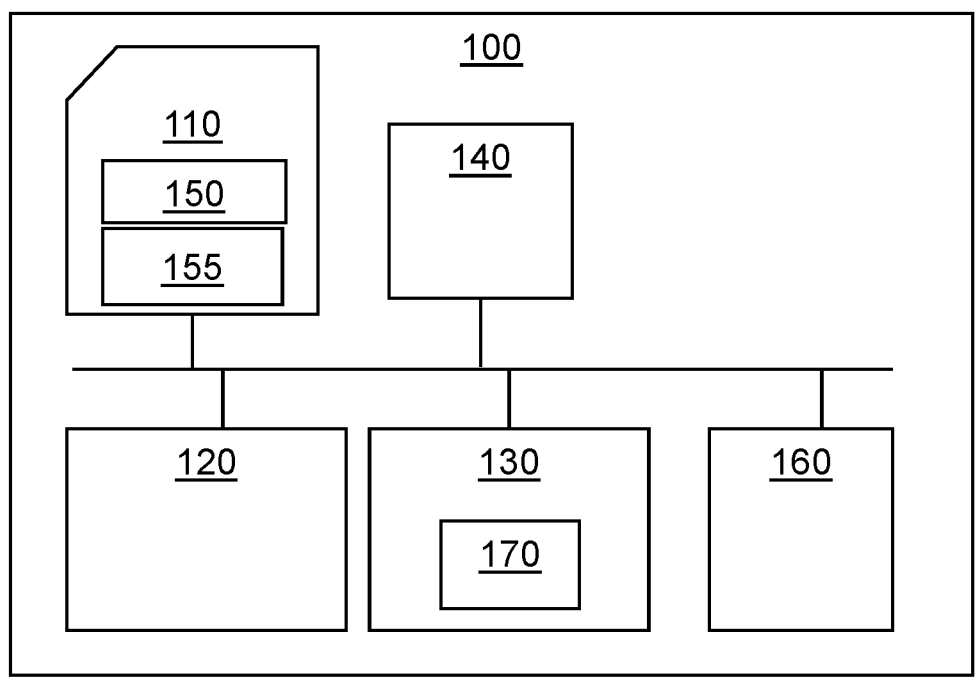
FIG. 1 is a schematic diagram of a user equipment according to examples.

Applications (or apps) which run on mobile devices may have a need for data transmission in order to perform their primary and/or secondary functions. For example, a taxi-hailing application which connects a user of the mobile device to a taxi for the provision of transport services may use data transmission. Data representing the profile of the user of the mobile device, the current location of the user of the mobile device and the objective destination of the user of the mobile device may all be transmitted to a service provider and/or an operator of a taxi in order to provision a taxi service. Charging functions may also be performed through data transmission to and from the mobile device, in order to allow the user of the mobile device to pay the taxi operator for their service.

Other examples of applications which require data transmission to perform primary and/or secondary functions include media streaming applications for providing music and/or video services to a user of the mobile device, news applications for providing news articles to a user of the mobile device, email applications, and so forth.

In some cases, the mobile device may not have a data communications status which is compatible with the need for data transmission of the application. For example, the mobile device may have no secure profile which is currently active, and so cannot currently perform data transmission. The device may have an inactive communications status in respect of its cellular network data interface and/or any other data interface on the mobile device, and so cannot fulfil the need for data transmission of the application. In other cases, the mobile device may have an inappropriate communications status in respect of its cellular network interface, for example, the mobile device may have one or more secure profiles enabled but the application may not have authorisation to access a cellular network data communications session (or data session) using the active secure profile(s). For example, where the one or more active secure profiles relate to an existing cellular network subscription to provide messaging, multimedia, and voice over IP services to the user of the mobile device, the existing cellular network subscription may limit data transmission to a group of one or more approved applications and/or purposes. Limiting data transmission for a cellular network subscription may be implemented to prevent excess data usage and hence unexpected charges.

Certain examples described herein relate to the provision of temporary or persistent connectivity for use in an application which is executable, or currently executing on, a mobile device (or "user equipment, UE"). The temporary or persistent connectivity may be provided through the use of a secure profile in the mobile device, which is enabled and/or activated upon request from the application.

In certain examples, a data session established through the use of the secure profile may be restricted by the app, the mobile device, and/or the cellular network providing the data session. Restrictions on the data session may be specified by the app in the request for the data session, and/or may be pre-determined and associated with the secure profile used to provide the data session. Restrictions may include restrictions of which applications in the mobile device are authorised to use the data session, restrictions on the volume and/or type of data which is transmitted during the data session, and/or restrictions on the IP addresses which are accessible to the mobile device through the data session.

FIG. 1 illustrates a mobile device 100, which may be referred to as a user equipment, UE, comprising at least one processor 120 and computer-readable storage 130, and one or more communication modules 140. The mobile device 100 is an equipment such as a smartphone or laptop, supporting cellular data connectivity and upon which software applications can be installed and executed. While the term "mobile device" is used here it is to be appreciated that other remote devices which are capable of cellular network connectivity may be used, including devices which are installed permanently or semi-permanently at remote locations. For example, appliances, vehicles, and other machines capable of cellular network connectivity may be considered to be "mobile devices". The mobile device 100 comprises an Operating System 170 (OS), for example an operating system of a Vendor, included in the computer-readable storage 130. Examples of operating systems include iOS®, Android®, MacOS, Microsoft Windows®, and open source operating systems such as Linux based operating systems. In some examples, the computer-readable storage 130 may be referred to as computer-readable storage medium. However, it will be appreciated that the computer-readable storage 130 may comprise one or more physical storage mediums or may be virtualised storage.

The at least one processor 120 may include various processing units including a central processing unit (CPU), a graphic processing unit (GPU), and/or specialist processing units for performing specific functions within the mobile device 100. The at least one processor 120 may include other specialist processing units, such as application specific integrated circuits (ASICs), digital signal processors (DSPs), or field programmable gate arrays (FPGAs).

The storage 130 may be embodied as any suitable combination of non-volatile storage and/or volatile storage. For example, the storage 130 may include one or more solid state drives (SSDs), along with the non-volatile random-access memory (NVRAM), and/or volatile random-access memory (RAM), for example, static random-access memory (SRAM) and dynamic random-access memory (DRAM). Other types of memory can be included such as removable storage synchronous DRAM, and so forth. The storage 130 may represent a portion of storage included in the mobile device 100 wherein the storage 130 may refer to a virtualised portion of storage implemented as part of a total storage included in the mobile device 100.

The communication module(s) 140 may include any communication module adapted to communicate over a suitable wireless communication type. For example, the communication module(s) 140 may use any of Wi-Fi®, Bluetooth®, infrared, cellular frequency radio waves, or any other suitable wireless communication type. Additionally, the communication module(s) 140 may be arranged to transmit and receive data over a wired connection.

The mobile device 100 includes a secure profile 150. The secure profile 150 is a data entity stored in memory that may be used to provide network authentication and access. In some examples, the secure profile 150 may be transmitted via a data communications network to the mobile device 100. The secure profile 150, when used, may enable a mobile device 100 to establish a data communications connection via a cellular network. The secure profile 150 may be included in a secure module 110 which is installed on the mobile device 100. This entity, secure profile 150, may be one or more of a "SIM profile", an "operational profile", or a "bootstrap profile", which may also be referred to as a "provisioning profile". In some examples, the primary function of the secure profile 150 is to provide the mobile device 100 with the credentials and cryptographic resolving functions to enable the mobile device 100 to a cellular data communications connection. This primary function may be unrelated to a general mobile cellular network subscription associated with the mobile device 100 and used for day-to-day connectivity e.g. a mobile cellular network subscription used to facilitate calls, SMS, and/or web browsing.

The mobile device 100 comprises a secure module 110 which may be a separate hardware module, for example, an embedded and/or integrated module such as an eUICC, also referred to as eSIM, iUCC, and soft SIM, or a SIM (e.g. a physical UICC). The secure module 110 may support any cellular network access technology (e.g., 2G, 3G, 4G, 5G, Low Power). The secure module 110 may comprise one or more further secure profiles 155, which are used by the mobile device 100 to provide cellular network communications services based on one or more subscriptions of a user of the mobile device for day-to-day communications.

The mobile device 100 comprises a communications-enabled application (or "App") 160. The app 160 is a software application that is executable and/or executing on the mobile device 100. The app 160 uses a data communications connection to fulfil certain applicable in-built functions. For example, where the app 160 is a taxi hailing application installed on the mobile device 100, a data communications connection may be used by the application to transmit and receive data, such as data relating to the location of the mobile device 100, an assigned taxi operator, user profile data, and so forth. Other examples may include, a hotel reservation application, a media streaming application, and others.

The app 160 may be provided to the mobile device 100 by being downloaded and installed in the mobile device 100 from a digital distribution platform. A digital distribution platform, also referred to as an "App Store", is a platform for apps, developed and maintained by either an Original Device Manufacturer (ODM), an Original Equipment Manufacturer (OEM), or other third parties related to the user equipment. The digital distribution platform may comprise a third-party marketplace that offers services requiring data connection, for example, Apple App Store and Google Play Store. The digital distribution platform may be accessible via the internet and/or a remote network. The app 160 may be downloaded from the digital distribution platform via a suitable communication method, for example, the mobile device 100 may communicate with the digital distribution platform via the communication module(s) 140, using any suitable communication type enabled in the communication module(s) 140.

Figure 2:
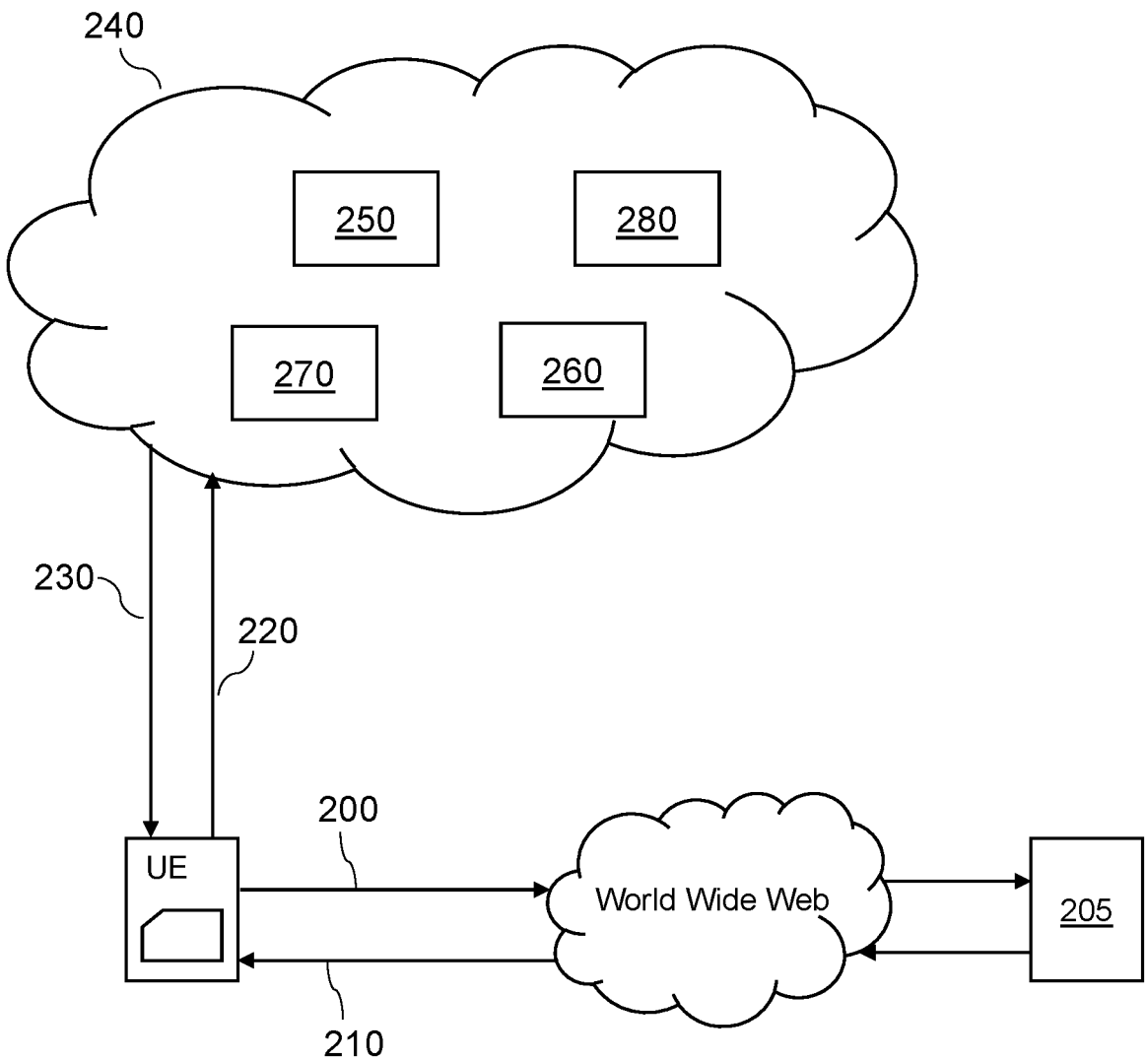
FIG. 2 shows schematically a process of downloading an application and a secure profile according to examples.

FIG. 2 shows schematically a process of a mobile device 100 downloading an app 160 from a digital distribution platform 205 according to an example. The mobile device 100 initiates a data session 200 to download an app 160 from a digital distribution platform 205 via the world wide web. The app 160 is downloaded 210 and installed in the mobile device 100. In the example shown in FIG. 2, the mobile device 100 communicates with the digital distribution platform 205 via the world wide web without accessing a cellular network 240. This may be the case where, for example, the mobile device 100 accesses the digital distribution platform 205 using Wi-Fi®.

In other examples, the mobile device 100 is registered with a cellular network 240, e.g. via the further secure profile(s) 155, and the data session 200 for downloading the app 160 is a cellular network data session established using the further secure profile(s) 155. The cellular network 240 shown in FIG. 2 comprises a gateway 250, e.g. a Packet Data Network Gateway (PDN-GW), a remote SIM provisioning platform 260, and network functions 270, for example, charging, managing, and accounting functions, which may also be referred to collectively as a backend functions. The cellular network 240 may also comprise a tunnelling proxy 280. The cellular network 240 may be implemented as one or more computing devices, including any suitable combination of hardware and software, distributed over a geographic area, comprising suitable communications technology for communicating with one or more mobile devices 100. The cellular network 240 may also comprise interfaces for communicating with other networks and/or remote servers, for example, the internet.

In some cases, the app 160 may be pre-provisioned on the mobile device 100 during manufacture, for example, certain mobile device 100 manufacturers may include software, such as the app 160, on the mobile device 100 during manufacture of the mobile device 100 before providing the mobile device 100 to users.

As described above the app 160, is a data communications-enabled app and may have a dependency on having a secure profile 150 installed in the mobile device 100 to allow cellular network data communications, for example, where no other data communication sessions, e.g. via Wi-Fi®, are available. In examples where the mobile device 100 does not initially have a suitable secure profile 150 installed on the mobile device 100 to enable the app 160 to access a data communications session, a process of downloading a secure profile 150 from the cellular network 240 may be initiated. FIG. 2 shows the mobile device 100 downloading a secure profile 150 from the cellular network 240 through communications 220 and 230. The mobile device 100 may download the secure profile 100 via any suitable communication method, for example, the secure profile 150 may be downloaded using Wi-Fi, cellular connectivity, and other suitable communications methods.

While two communications 220 and 230 (a request and response) have been shown in FIG. 2, it will be appreciated that any number of signals may be transmitted between the cellular network 240 and the mobile device 100 when downloading a secure profile 150. For example, an initial reservation message may be sent to the remote SIM provisioning platform 260 in the cellular telecommunications network 240. The operating system 170 of the mobile device 100, may then request the secure profile 150 from the remote SIM provisioning platform 260. Once the secure profile 150 has been received one or more notification messages may be sent between the mobile device 100 and the remote SIM provisioning 270 platform to confirm. In some examples, the operating system 170 installed in the mobile device 100 may initiate the downloading of the secure profile 150 after identifying the need for the secure profile 150 when downloading the app 160. For example, meta-data included with or as part of the app 160 data may indicate the need for a secure profile 150. In other examples, the app 160 may identify that no suitable secure profile 150 is installed on the mobile device 100 and may initiate the process by instructing the operating system 170 of the mobile device 100. In examples where the mobile device 100 does not have a suitable secure profile 150 installed on the mobile device 100, installing the app 160 may trigger a process for downloading a secure profile 150 from a cellular network 240 and installing the secure profile 150 on the mobile device 100. Alternatively, or additionally, the app 160 and/or the operating system 170 may initiate the download of the secure profile 150 at a later time, for example, the first time the app 160 is run on the mobile device 100, or after a pre-determined period of time from when the app 160 has been downloaded. Alternatively, or additionally, a user of the mobile device 100 may initiate the download of the secure profile 150. For example, the user may operate the mobile device, e.g. through a user interface, to download the secure profile 150. In some cases, the mobile device 100, may determine, e.g. by the app 160 or operating system 170, that a secure profile 150 is required and notify the user, e.g. via the user interface, to request confirmation from the user to download the secure profile 150.

In some examples, the secure profile 150 may be installed to a secure module 110, wherein the secure module 110 is able to store and operate one or more secure profiles, including the secure profile 150. The secure profile 150 may be sourced from the original equipment manufacturer and be suitable for use by applications installed on the mobile device 100, which are configured to perform the methods described below with respect to FIG. 3, to provide data connectivity. Alternatively, the secure profile 150 may be suitable for use by only a subset of all apps installed on the mobile device 100 including, for example, app 160. The responsible parties who provide the secure profile 150 to the mobile device 100, e.g. the original equipment manufacturer, may have the capability of providing a plurality of secure profiles to the mobile device 100, wherein each secure profile may be suitable for use in a different geographic location. The plurality of secure profiles may also include one or more application specific secure profiles which are to be used by respective specific applications, e.g. app 160, for providing cellular network data connectivity to the applications.

In certain cases, the mobile device 100 may already comprise the secure profile 150 and may, under certain pre-defined conditions, choose to enable the secure profile 150 to access a remote server, via the internet or a private network, as needed to satisfy those pre-defined conditions. An example of this is a situation in which the mobile device 100 has not had a data communications connection for more than a week. In this case the mobile device 100 may use the secure profile 150 to download an update of the latest version of one or more configuration files. The pre-defined conditions in which such a secure profile 150 may be used may be expanded by the app 160 and/or the operating system 170 to include the provision of cellular network data connectivity to fulfil the functions of the app 160.

Figure 3:
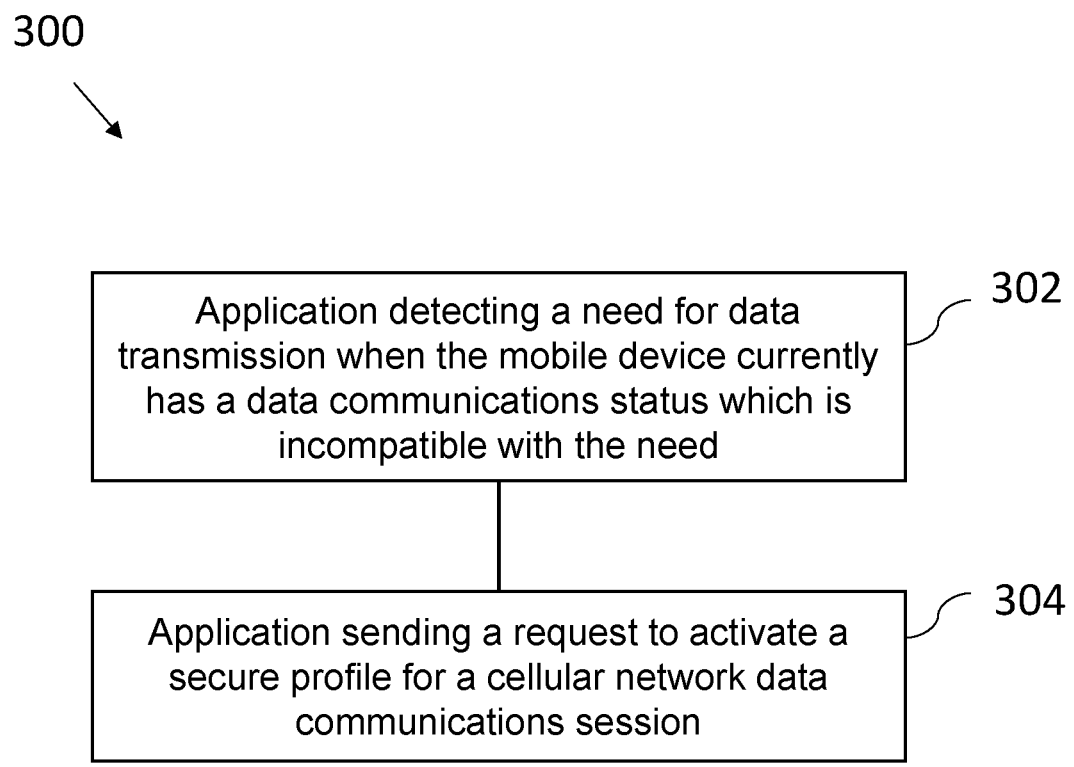
FIG. 3 is a flow chart showing a method of operating a communications-enabled application on a mobile device according to examples.

FIG. 3 shows an example of a method 300 of operating a communications-enabled application 160 on a mobile device 100. At a first block 302, the method 300 comprises the app 160 detecting a need for a data transmission when the mobile device 100 currently has a data communication status which is incompatible with the need. For example, the mobile device 100 may have a limited data connectivity such that only specific pre-determined applications or functions within the mobile device 100 are authorised to use the data connectivity. Alternatively, the mobile device 100 may have no data connectivity. The app 160 may detect the need for data transmission when the app 160 is opened on the device 100, for example, in response to input from a user of the mobile device 100. In other examples, the app 160 may detect the need for data transmission when a user of the mobile device 100 attempts to perform certain functions within the app 160. Alternatively, or additionally, the app 160 may detect the need for data transmission automatically, without input from the user. Upon determining a need for data transmission, the app 160 may communicate with the operating system 170 of the mobile device 100 to identify whether a current data communications status of the mobile device 100 is suitable to satisfy the need.

Figure 4:
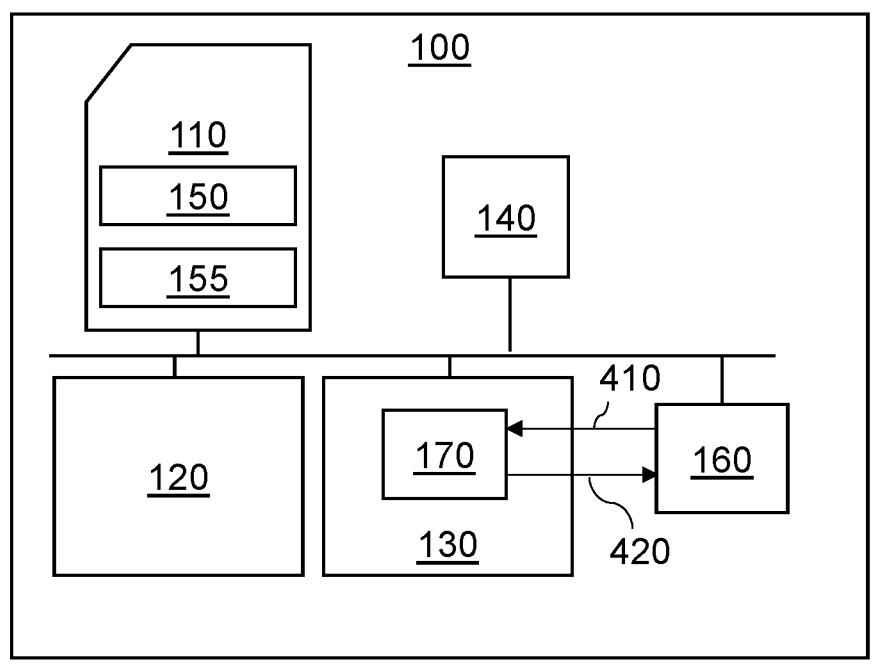
FIG. 4 is a schematic diagram showing a method of an application requesting access to a secure profile according to examples.

At a second block 304, the app 160 sends a request to activate the secure profile 150 for a cellular network data communications session. A cellular network data communications session (or "data session") is a cellular connectivity session enabled through the secure profile 150 for an authorised app 160 on the mobile device 100, to provide access to the internet or a remote network. The use of the data session may be for a temporary or persistent period of time and suitable for one or more data communications-based functions of the app 160. The app 160 may send the request to the operating system 170 of the mobile device 100. FIG. 4 shows an example in which the app 160 sends the request 410 to the operating system 170 of the mobile device 100 to enable a secure profile 150 to provide cellular network data communications. The mobile device 100, and in particular the operating system 170 of the mobile device 100, may include one or more programmatic software interfaces for applications 160 in the mobile device 100 to request to enable the secure profile 150 to provide a data session to the mobile device 100, for use by the applications 160. As such, the request 410 may be implemented using the programmatic software interface(s). The programmatic software interface(s) may include any of an API, an SDK or other suitable triggering mechanisms in the mobile device 100 which are available to the app 160. In order for the app 160 to use the programmatic software interface, the app 160 may be pre-configured during development, compilation, or configuration of its associated meta-data to support the use of the programmatic software interface(s).

The request 410 to activate the secure profile 150 may be dependent on a type of cellular network data communications session which is required. In this case, the app 160 may determine the type of cellular network data communication session required, for example, a type of cellular network data communications session may specify a type of data which is to be transmitted and received by the app 160 and/or whether the data session is to be limited by one or more characteristics, such as time period, volume of data usage, speed restrictions, whether other applications are authorised to utilise the data session, and which services may be accessed using the data session.

Following the request 410, the operating system 170 of the mobile device 100 may perform a method, as will be described below in relation to FIG. 5, to control the secure profile 150 to establish a cellular network data communication session for the app 160. The app 160 may generate a unique identification number or string ("UID") for the cellular network data communication session, this may be referred to as a session ID. The UID, or a derivative of it, may be used by the app 160 for monitoring and/or managing the cellular network data communications session, such as for the purposes of accounting, charging, and billing for the data session. In some examples, the UID includes identifiers relating to the mobile device 100 and/or an end user identification known to the app 160. Alternatively, the UID may be a unique random alphanumeric string.

The app 160 may send the session ID, and initial session data, to the operating system 170 of the mobile device 100. This may enable the operating system 170 to monitor and/or manage the data session. The initial session data may comprise any suitable information for establishing and/or monitoring the data session. For example, the initial session data may include metadata used to establish and/or monitor the session. Metadata may include one or more identifiers relating to mobile device 100, or cellular network 240 components or functions which are involved in establishing the data session. The metadata may additionally, or alternatively, include information identifying the user of the app 160. The initial session data may additionally, or alternatively, include data relating to the initial communications between the mobile device 100 and the cellular network 240 when establishing the cellular network data communications session.

Once the cellular network data communications session is established, the app 160 may record data session metrics associated with the cellular network data communications session. These data session metrics may be stored as session data in the app 160. The metrics may include volume of data usage, the type of data transmitted and/or received during the data session, the period of time for which the data session is established, and so forth. The metrics which are recorded may be suitable for performing accounting, charging, and billing functions, as well as for monitoring the data session for diagnostic and/or troubleshooting purposes. The session data, including these metrics, may be transmitted to the operating system 170 of the mobile device 100 while the data session is in operation and/or once the data session is concluded.

In some examples, the app 160 may control and/or limit the data session. For example, the app 160 may be operable to control duration of the data session and/or the volume of data transmitted and received during the data session. For example, the app 160 may monitor the session data, including the metrics associated with the data session, and send a request to deactivate the data session when pre-determined limits for the period and/or data usage have been reached. Alternatively, or additionally, the app 160 may deactivate the data session when the functions of the app 160 which require the data session have been completed. In other examples, the data session may be terminated upon receipt of a user command provided via the app 160 and/or when alternative connectivity, e.g. Wi-Fi connectivity, becomes available. When terminating the data session, the app 160 may transmit the final session data to the operating system 170, wherein the final session data may comprise all of the session data generated during the data session or session data generated since the app 160 previously sent session data to the operating system 170.

In certain examples, the data session which is requested by the app 160 may be a restricted cellular network data communications session, where only the requesting app 160 is authorised to use the data session. In other examples, the app 160 may request a partially restricted, or an un-restricted, cellular network data communications session. For example, the app 160 may offer an end user of the device the option to select a data plan through the app 160 to allow access to the data session for a specified period of time and/or to allow a pre-determined volume of data, e.g. 500 MB valid for one day, to be used by a group of one or more applications in the mobile device 100.

If the end user of the device 100 decides to accept the offer of the app 160, the data session may be an open data session allowing other applications installed in the mobile device 100 to access the data session. If, during the period in which this data session is active, another app attempts to activate the secure profile 150, this request would be rejected, since the secure profile 150 is already in use on the mobile device 100. The application 160 may have the capability of offering a plurality of data package sizes having varying characteristics. In some cases, the user of the app 160 may be able to specify a desired characteristic of a data session which the user would like to purchase. For example, a taxi-hailing app may offer an end user of the app 160 a temporary or persistent data-package, purchasable in the app 160 and provided using the secure profile 150 and the mobile device 100 and/or the end user may specify the total volume of data (uplink and downlink) to be provided in the data session. Other examples may include a media streaming service offering a data-package which is suitable for transmitting one or more films, tv shows, and/or music albums or playlists to the mobile device 100.

In other examples, one or more data packages may be purchasable from the digital distribution platform 205 but offered to the user of the mobile device 100 through the app 160. In other words, the app 160 may act as a re-selling channel through which products and services offered by the digital distribution platform 205 are displayed to a user of the mobile device 100 and/or selected by the user.

Figure 5:
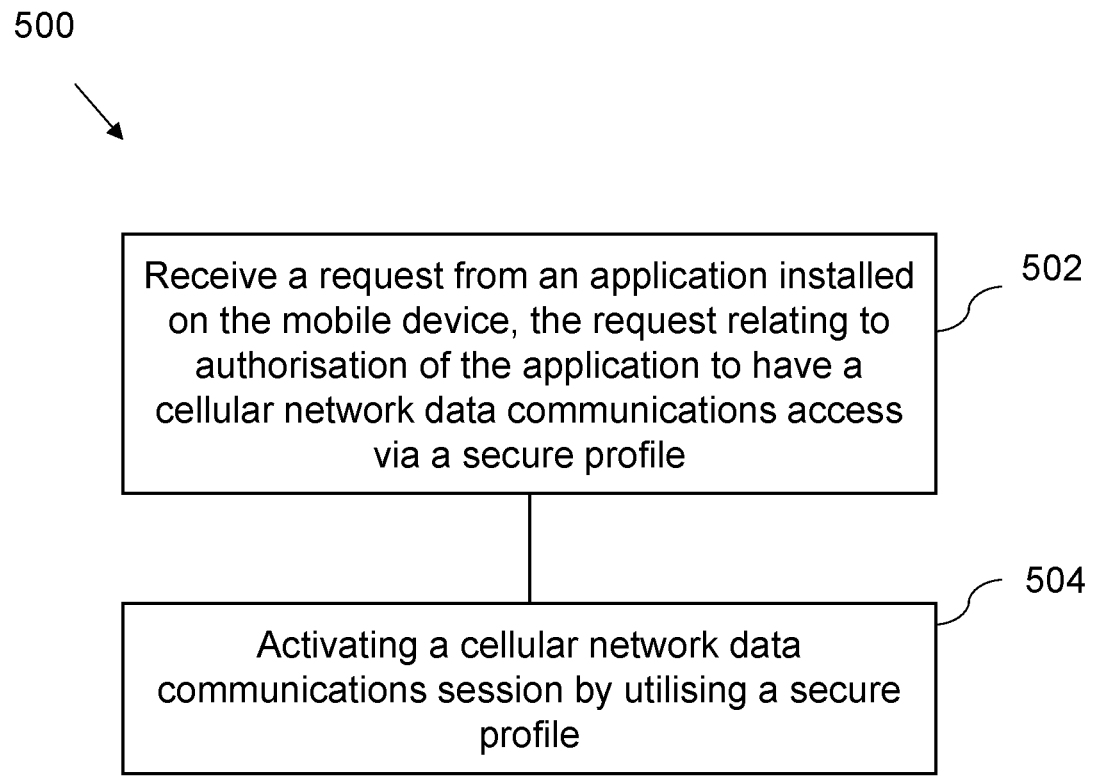
FIG. 5 is a flow chart showing a method of controlling a secure profile via an operating system installed on a mobile device according to examples.

FIG. 5 shows a method 500, of controlling a secure profile 150 via an operating system 170 installed on the mobile device 100. At a first block 502 the method 500 comprises receiving a request from an app 160 installed on the mobile device 100. The request relates to authorisation of the application to have a cellular network data communications access via the secure profile 150. As described above, this request may be received from the app 160 using one or more programmatic software interfaces. Where the mobile device 100 does not already have a secure profile 150 which is suitable for providing a cellular network data communications session for the app 160, the operating system 170 may download a secure profile 150, as described above in relation to FIG. 2.

At a second block 504, the method 500 comprises activating a cellular network data communications session by utilising the secure profile 150. Establishing the cellular network data communications session comprises registering with the with the cellular network 240 using the secure profile 150 and transmitting the session ID to the cellular network 240. The session ID may be transmitted to the network functions 270 for the purposes of monitoring, charging, and billing. In some cases, initial session data may also be transmitted to the cellular network 240 to establish the data session.

Alternatively, the operating system 170 may determine, for example based on metadata associated with the app 160, or via a push notification received at the mobile device, that the app 160 is a data communications-enabled application and/or that there is a need for data connectivity for the app 160. Based on this determination, and where the mobile device 100 does not currently have a communications status suitable to satisfy the data connectivity need of the app 160, the operating system 170 may activate the secure profile 150 to enable cellular network data connectivity to be provided to the app 160.

In some examples, the operating system 170 may perform further functions to manage the data session. For example, the operating system 170 may monitor data session metrics such as uplink and downlink usage during the data session. These data session metrics may be included in the session data. The operating system 170 may alternatively, or additionally, receive the data session metrics associated with the cellular network data communications session, for example, from the app 160. The operating system 170 may store the metrics, and send the metrics associated with cellular network data session, for example to the network functions 270. The operating system 170 may transmit the metrics associated with the cellular network data communications session to network functions 270 in the cellular network 240 and/or to the digital distribution platform 205, either via the cellular network 240 or over other suitable communications methods. The data session metrics may be transmitted by the operating system 170 at regular intervals, or when certain pre-determined criteria have been met, for example, after a pre-determined amount of data has been transmitted and/or received. The data session metrics may be included in session data either generated by the app 160, the operating system 170, or a combination of both.

The data session metrics can then be used for the purposes of accounting, charging, billing and in some cases for network diagnostics and/or troubleshooting, by either one or both of the network functions 270 in the cellular network 240, and the digital distribution platform 205. In other words, the user of the mobile device may be charged for the data session through the digital distribution platform 205, or directly by the operator of the cellular network 2240, for example, where the user is registered with the operator of the cellular network 240. Alternatively, or additionally, the operators and/or manufacturers of the app 160 may be charged through the digital distribution platform 205 and may bear these charges or forward the charges to the user of the mobile device 100. These metrics may be associated with the session ID for the data session to allow the data usage to be tracked and accounted for.

Upon receiving the request to activate the secure profile 150 from the app 160, the operating system 170 may check that the app 160 is authorised to access this function. The applicable methods for authorisation may be performed locally on the mobile device 100. Authorising the app 160 may involve processing meta-data included with or associated with the app 160 and/or a cryptographic check based on public key cryptography. It is to be understood that other suitable authorisation methods may be utilised. The operating system 170 may also check that the secure profile 150 is able to access a cellular network 240 which corresponds with the current geographic location of the mobile device 100. The operating system 170 may enforce other rules or authorisation checks including, the number of times the app 160 has requested a data session in a given time period. In other examples, the authorisation of the app 160 may be managed by a remote server in the cellular network 240 and enforced locally on the mobile device 100 by the operating system 170.

In some cases, the operating system 170 of the mobile device 100 may restrict the data session provided to the requesting app 160, a group of apps, or alternatively, any applicable software process that can utilise the data session on the mobile device. The type of restriction may be determined during the authorisation of the request by the operating system 170. In some cases, the type of restriction needed by the app 160 may be indicated in the initial request 410, or in a subsequent communication to the operating system 170. Examples of restrictions on the data session may include restricting a volume of data transmission, a duration of the data session, and or restricting the apps which can access the data session, for example by allowing only outbound or inbound data traffic generated by or destined for the one or more authorised applications, including app 160. In such cases, the operating system 170 may track and monitor the data session, including the volume of uplink and downlink data that is utilised during the session.

At the end of the data session, for example where the functions in the app 160 using the data session have concluded, where pre-determined data usage limits have been reached, where alternative data connectivity, for example, via Wi-Fi, becomes available, and/or where a user of the app 160 chooses to end the data session, the app 160 may send a request to end the data session and/or to disable the secure profile 150 in the mobile device 100. The request to end the data session may be sent from the app 160 to the operating system 170. Alternatively, a user of the mobile device may directly end the data session using the operating system 170, for example, via a user interface.

Figure 6:
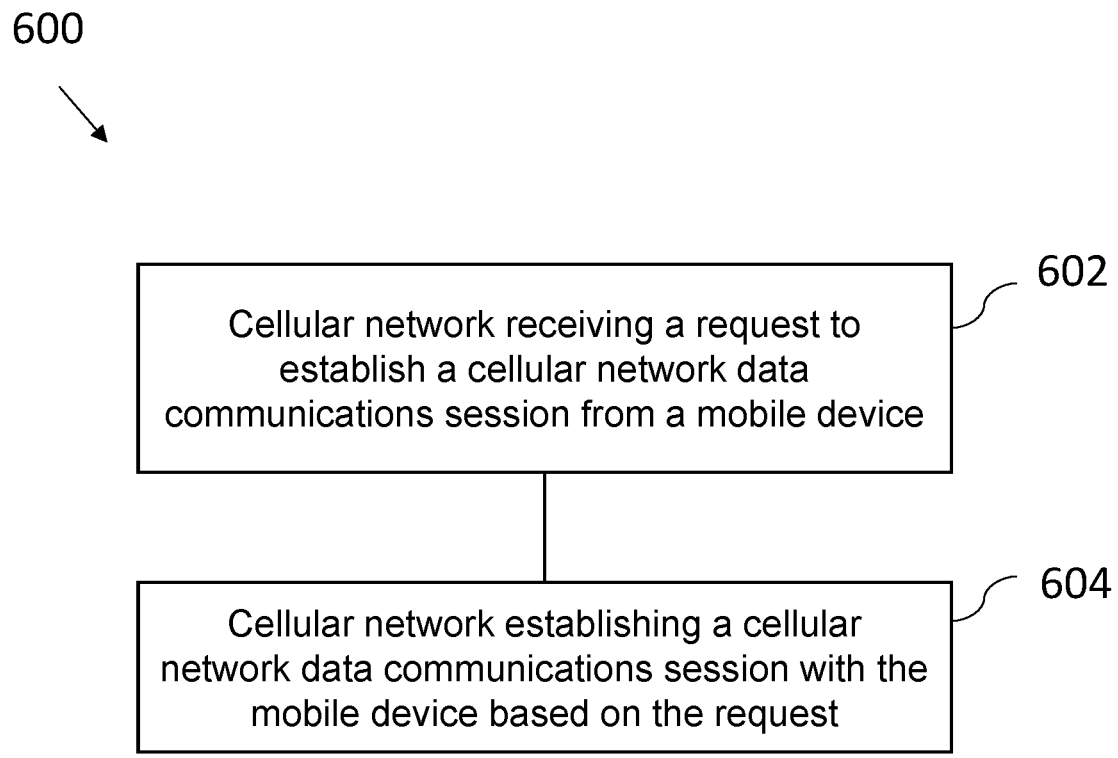
FIG. 6 is a flow chart showing a method of operating a cellular network according to examples.

The operating system 170 of the mobile device 100 may then disable the secure profile 150 in the mobile device 100. When ending the data session, the operating system 170 may send final total data usage information for receipt by either of the cellular network 240, in particular the network functions 270, and the digital distribution platform 205. The final total data usage information may be included in final session data FIG. 6 shows a method 600 of operating a cellular network 240 for providing cellular network data communications to the mobile device 100. At a first block 602, the method 600 comprises the cellular network 240 receiving a request to establish a cellular network data communications session from the mobile device 100. The cellular network 240 may determine one or more settings for the data session based on this request. For example, the one or more settings may represent characteristics of the data session, including authorized applications, volumes of data usage, and/or period.

The cellular network 240 may identify the app 160 and/or the mobile device 100 based on the request to establish the cellular network data communications session. For example, the request to establish the data session may comprise identifier details. Identifier details may include, for example, the app 160 access point name (APN), e.g. an APN associated with the secure profile 150 which is used by the mobile device 100 to provide data connectivity to the app 160, the mobile station international subscriber directory number (MSISDN) of the secure profile 150, an International Mobile Subscriber Identity (IMSI) associated with the secure profile 150, an International Mobile Equipment Identifier (IMEI), or other suitable identifier details associated with the app 160 or the secure profile 150.

At a second block 604, the method 600 comprises the cellular network 240 establishing a cellular network data communications session with the mobile device 100 based on the request. The cellular network data communications session may enable the mobile device 100 to connect to the internet via a gateway 250 included in the cellular network 240, e.g. a Packet Data Network Gateway (PDN-GW).

When establishing the data session, the cellular network 240 may, if the identifier details include an app APN, re-write (or "re-configure") the app APN. For example, an APN server may be included in the cellular network 240 which is configured to receive requests from mobile devices 100 and to re-write APNs to enable data session connectivity for the functions of the app 160. The cellular network 240 may retrieve DNS settings for the data session based on the app APN, or other identifier details, and establish an accounting session for the upcoming data session. This enables tracking and storing data session information for accounting, billing, and charging functions. The cellular network 240 may transmit session configuration data to the mobile device 100 when establishing the data session. The cellular network 240 may be arranged to receive the session ID and other data (e.g. initial session data) from the mobile device 100, for the purposes of tracking and storing the data session and establishing the data session. To this end, the cellular network 240 may associate the session ID with the established accounting session. The session ID may be provided to the network functions 270 in the cellular network 240, either directly, or via one or more other elements in the network 240.

In some examples, the cellular network 240 may be arranged to manage and/or restrict the data session. In this case, the session configuration data transmitted to the mobile device 100 may include restriction information specifying a manner in which the data session is to be restricted, for example, a data limit (uplink and downlink).

The cellular network 240 may actively restrict the data session, for example, where only specific applications (such as the requesting app 160) are authorised to use the data session. In some examples, the cellular network 240 may restrict access based on DNS requests from the mobile device 100. The cellular network 240 may receive an app DNS request, for example in the form of data received from the mobile device 100 indicating a domain name request. If the app 160 is not authorized to access data connectivity via the cellular network 240, the request is refused, and the method ends. If the app 160 is authorized to access data connectivity via the cellular network 240, the request is accepted, and the mobile device is authorized to access a domain name server based on the request, via the cellular network 240, in order to obtain one or more IP addresses.

During the data session, the app 160 may attempt to access a given IP address. If the IP address is not authorized for the data session, the data communications which the app 160 attempts to send to the given IP address is refused. If the IP address is authorized for the data session, the data communications transit is allowed by the cellular network 240 and the data communications are transferred between remote networks associated with the IP address and the mobile device 100 to provide the app 160 with data connectivity to fulfil its functions.

In some examples, the restrictions may be communicated to the cellular network 240 from the mobile device 100 when establishing the data session. In other examples, the cellular network 240 may determine one or more settings for the data session based on at least configuration data associated with the secure profile. For example, where the secure profile 150 is for use with a specific application, the cellular network 240 may access one or more data stores, such as databases comprising configuration information associated with the secure profile 150. For example, the secure profile 150 may be associated with one or more specific domain names representing an authorized list of domains which can be accessed using the secure profile 150, and/or a group of one or more authorized IP addresses.

The app 160 and/or the operating system 170 may periodically register data usage information to the cellular network 240 (e.g. in the form of session data) including for example, data uplink and downlink usage, data session time period, and accessed web addresses via the data session. The cellular network 240 may use the data usage information to monitor and/or restrict the data session to the mobile device 100. Alternatively, or additionally, the cellular network 240 may use the data usage information to perform certain accounting, billing, and/or charging functions. For example, at the end of the data session, the cellular network 240 may use the data session information to charge the costs of the data session either directly to the user of the mobile device 100 or to the digital distribution platform 205, through which the app developers may charge, or not charge, the user of the mobile device 100. Total data session usage information may also be transmitted to the cellular network 240 at the end of the data session for the purposes of accounting, billing, and charging.

While the preceding description discusses the restriction of the data session at the cellular network 240 based on per session DNS requests, the cellular network may manage, or restrict, the data session by alternative methods. For example, the gateway 250, e.g. PDN-GW in the cellular network 240 used to provide communications between the mobile device 100 and the Internet Protocol Networks, e.g. the internet, may be configured to allow only certain data traffic to be transmitted through the gateway, depending on an APN used to establish the data session. For example, the gateway 250 may implement specific rules for which communications may be transmitted based on the APN. The rules may be determined based on DNS settings associated with the APN. As an example, if a data session is established using a bootstrap profile, associated with an APN which identifies the remote SIM provisioning platform 260, the gateway 250 may restrict traffic during the data session so that only communications addressed to the remote SIM provisioning platform 260 are transmitted.

In some cases, the secure profile 150 which is used for accessing the data session on-demand from the app 160, may be associated with a specific APN. For example, the secure profile 150 to be used by the mobile device 100 to provide on-demand connectivity to apps, e.g. app 160, as described herein may belong to a specific profile type, for example, a Communication-as-a-Service (CaaS) profile type. The CaaS profile type is associated with a given APN, referred to hereafter as a CaaS APN. The CaaS APN is distinguished from APNs associated with the further secure profile(s) 155. Where the secure profile 150 is provisioned from the remote SIM provisioning platform 260, the remote SIM provisioning platform 260 may be configured to provide secure profiles belonging to the CaaS profile type and associated with the CaaS APN.

When the data session is being established, using the CaaS APN, the cellular network 240 may establish DNS settings for the secure profile 150, which is identified as a CaaS profile type based on its associated CaaS APN, and determine a list of allowed IP addresses for the data session. In some examples, the CaaS profile type may be limited so that only traffic directed to a tunnelling proxy 280 is transmitted through the gateway 250 during the respective data session. To prevent the unauthorised use of the data session, for example by non-authorized applications in the mobile device 100, the tunnelling proxy 280 may be secured such that only communications which include relevant credentials will be accepted by the tunnelling proxy 280.

Using a tunnelling proxy 280 as a destination for traffic during the data session may enable restrictions, implemented by the gateway 250, to be simplified. In other words, the gateway 250 will reject all traffic not addressed to the IP address of the tunnelling proxy 280 during the data session established with the secure profile 150. One such example of a tunnelling proxy 280 which may be used is a SOCKS proxy.

In examples where the gateway 250 restricts data communications for CaaS profile types, such that they are only capable of communicating via the tunnelling proxy 280, configuration data may be provided to the app 160, for example, from the network functions 270 via the mobile device 100, for use in configuring the app 160 to address communications during the data session to the tunnelling proxy 280. After receiving the configuration information, the app 160 may configure, or reconfigure, an HTTP client in the app 160 based on the configuration data. The configuration data may include, for example, information identifying an appropriate tunnelling proxy host, port, and/or credential information. Using a tunnelling proxy 280 to control data traffic during the data communications session may allow efficient monitoring of the data session and may allow the data session to be distinguished from other data sessions established with the mobile device 100.

Figure 7:
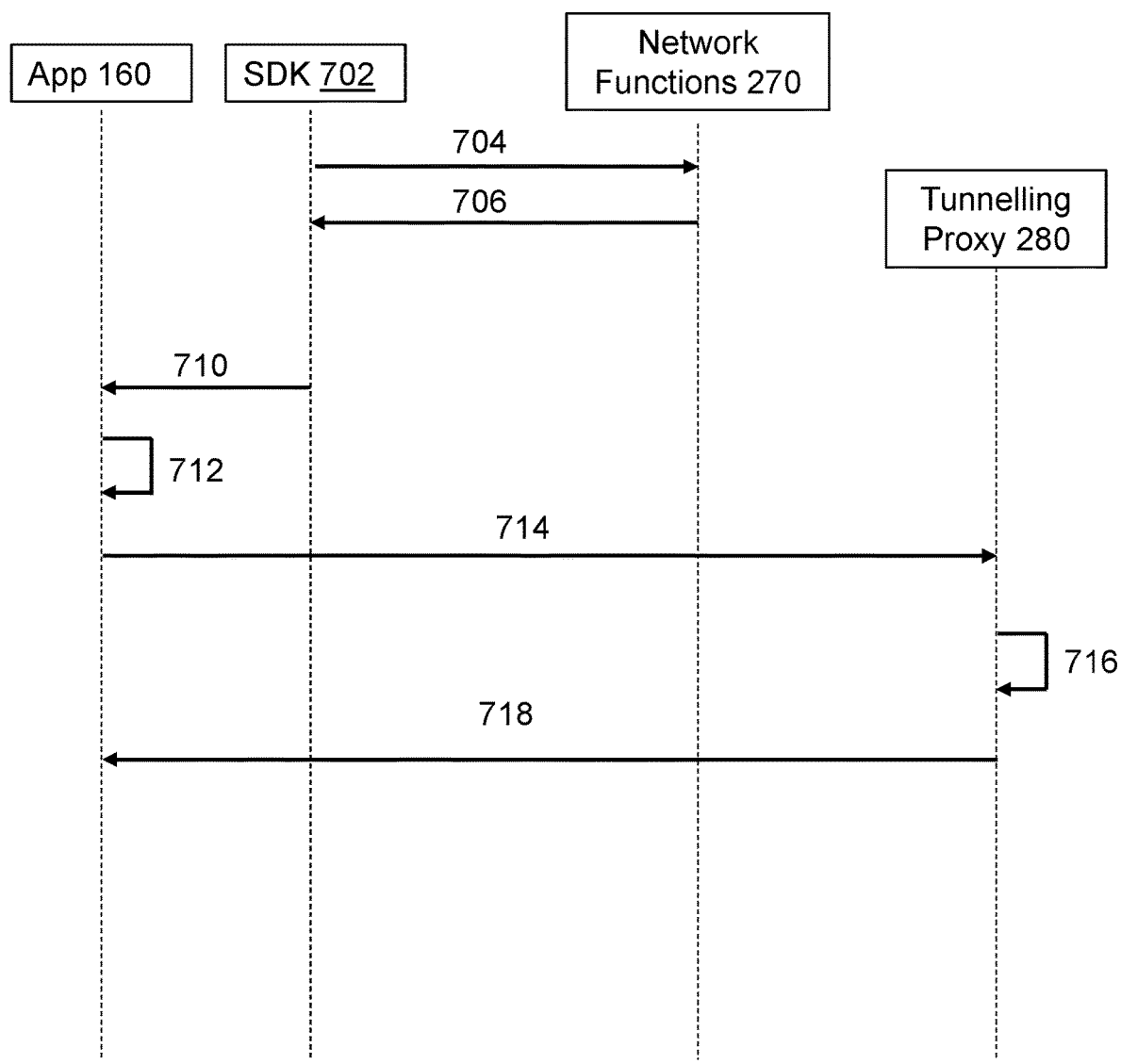
FIG. 7 is a sequence diagram showing a data session according to examples.

FIG. 7 shows an example of a data session based on the network restrictions in which a tunnelling proxy 280 is used. At a first step, an SDK 702, implemented by the app 160, sends a session start request 704 including an identifier of the app 160. The network functions 270 process the identifier and, if the app 160 is authorized to access a data session, provide 706 configuration data to be used during the data session. The network functions 270 may maintain a database identifying apps which are authorized to use data session established using the secure profile 150. Alternatively, the network functions 270 may access an external database, either within the cellular network 240, or external to the cellular network 240 to establish whether the app 160 is authorized to access the data session. The configuration data may include data for identifying and accessing the tunnelling proxy 280. For example, the configuration data may include information identifying a proxy host of the tunnelling proxy, a port, and in some examples, credentials, such as a username and password for accessing the tunnelling proxy 280.

The SDK 702 communicates 710 with the app 160 to provide it with the configuration data. The App 160, at step 712, configures an HTTP client within the app 160 based on the configuration data. The app 160, then sends http or https requests 714 to the tunnelling proxy 280. The requests 714 are forwarded by the tunnelling proxy 280 and responses are received 716. The responses are sent back to the app 160 from the tunnelling proxy 280. At the end of a session, the SDK 702 notifies 720 the tunnelling proxy 280, and the session end is communicated to the network functions 270.

Figure 8A:
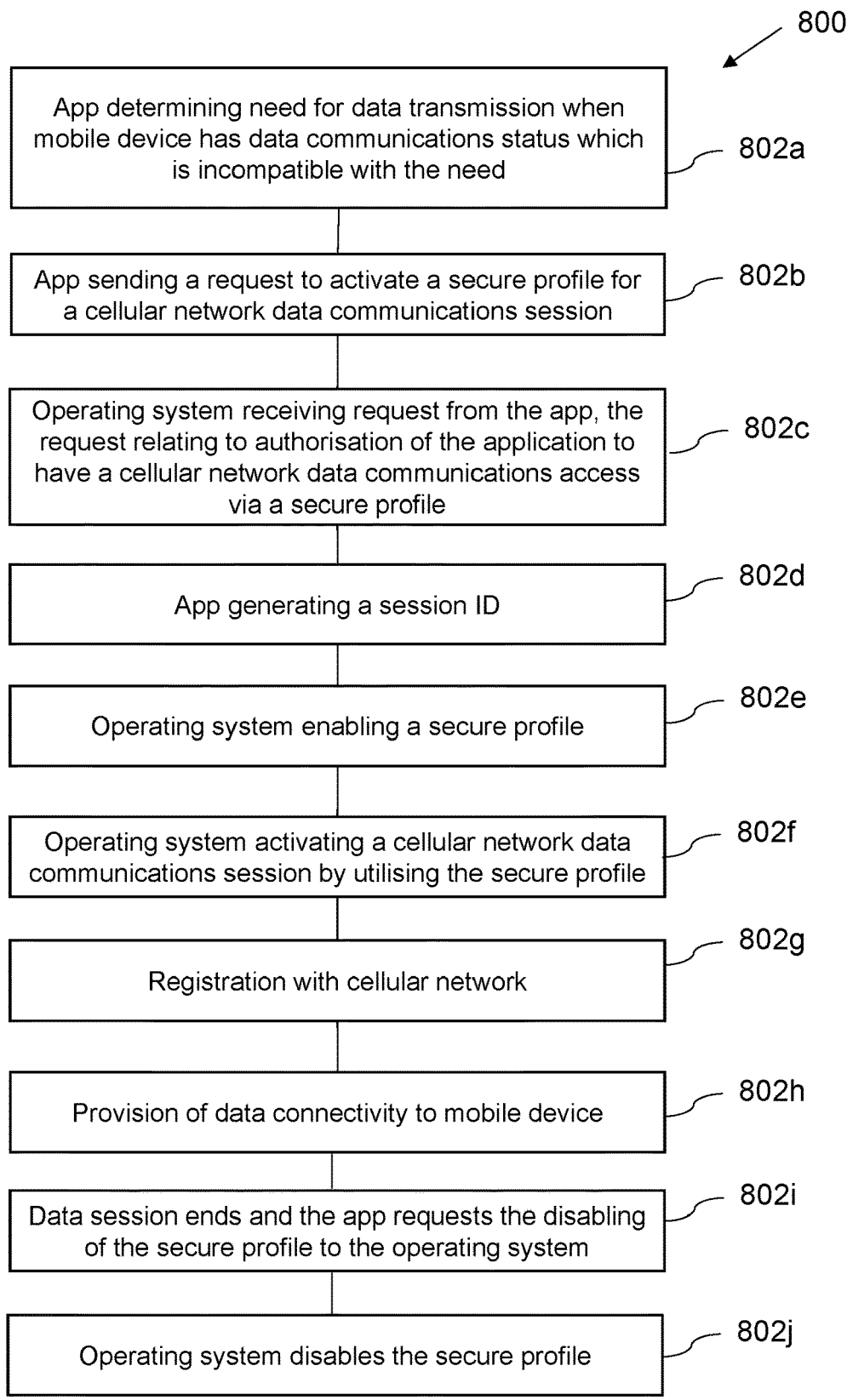
FIG. 8A shows a flow chart of methods implemented in a mobile device according to examples.
Figure 8B:
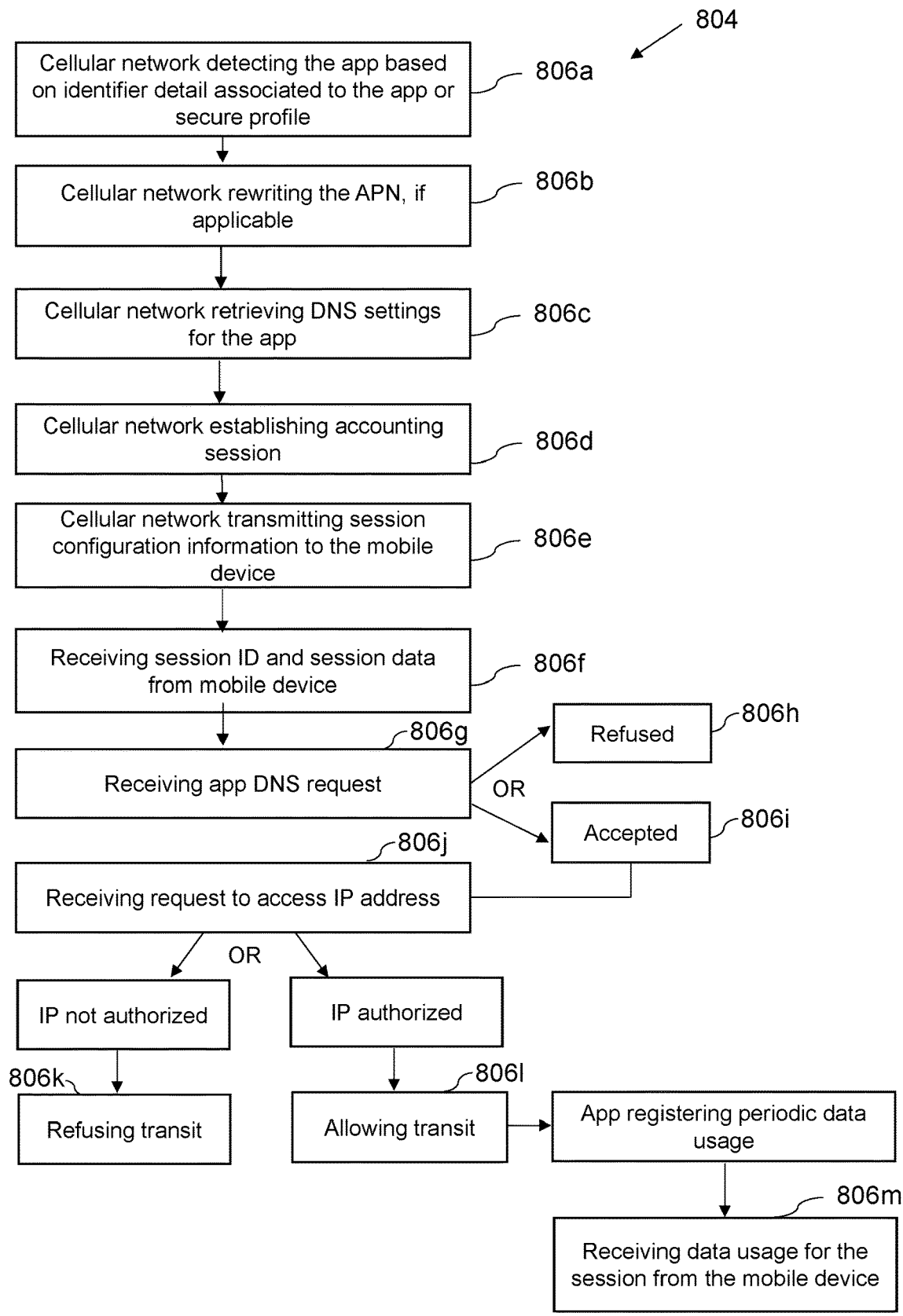
FIG. 8B shows a flow chart of a method implemented by a cellular network according to examples.

FIGS. 8A and 8B illustrate examples of methods described above, wherein certain method steps which may be performed by different entities, e.g. application 160 and operating system 170, have been shown together for ease of understanding. FIG. 8A illustrates a method 800, which includes method steps 802a to 802j, wherein some steps 802a, 802b, 802d, 802i, are performed by the app 160 and other steps, 802c, 802e, 802f, 802g, 802h, 802j are performed by the operating system 170 of the mobile device 100. FIG. 8B illustrates a method 804 comprising steps 806a to 806m according to certain examples described herein and implemented by the cellular network 240.

It will be appreciated by one skilled in the art that, while the method steps in FIGS. 8A and 8B have been shown in a certain order, the steps may be performed out of order, and in some cases concurrently. For example, the app generating a session ID at 802d and the operating system enabling a secure profile 802e may be performed in a different order to that shown in FIG. 8A.

The above embodiments are to be understood as illustrative examples. Further embodiments of the invention are envisaged. For example, where the data session ends abruptly due to drop in signal of the mobile device 100, the final total data usage (e.g. final session data comprising the final total data usage information) and any other associated meta-data could be submitted to the cellular network 240, or the digital distribution platform 205, the next time a suitable cellular network connection is available to the mobile device 100, or via another bearer such as a silent Short Message Service (SMS) communication. In other examples, the app 160 may offer the data session for free to the end user of the app 160 and may separately settle any fees due with the provider of the secure profile 150. A combination of the different charging and billing options described above is also possible.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

Numbered Clauses

The following numbered clauses describe various embodiments of the present disclosure.

1. A method of operating a communications-enabled application on a mobile device, the method comprising:
   the application detecting a need for data transmission when the mobile device currently has a data communications status which is incompatible with the need; and
   the application sending a request to activate a secure profile for a cellular network data communications session.

2. A method according to clause 1, wherein the method comprises sending the request to activate a secure profile to start the cellular network data communications session via a programmatic software interface on the mobile device.

3. A method according to clause 1 or clause 2, wherein the method comprises installing the secure profile on the mobile device.

4. A method according to any of the preceding clauses, wherein the method comprises generating a unique identification for the cellular network data communications session.

5. A method according to any of the preceding clauses, wherein the method comprises:
   determining a type of cellular network data communications session required; and
   sending the request to activate the secure profile to start the cellular network data communications session based on the type of cellular network data communications session required.

6. A method according to clause 5, wherein the method comprises:
   sending the request to activate the secure profile to start the cellular network data communications session to an operating system on the mobile device; and
   generating initial session data based on the type of cellular network data communications session required.

7. A method according to clause 6, wherein the method comprises sending the initial session data to the operating system.

8. A method according to clause 7, wherein the method comprises:
   recording metrics associated with the cellular network data communications session; and
   sending the metrics to the operating system.

9. A method according to clause 8, wherein the method comprises sending a request to deactivate the cellular network data communications session.

10. A method according to any preceding clause, wherein the method comprises:
receiving configuration data associated with a tunnelling proxy; and
using the configuration data to send data communications during the data session.

11. A method according to clause 10, wherein the configuration data comprises credentials for accessing the tunnelling proxy.

12. A method of controlling a secure profile via an operating system installed on a mobile device, the method comprising:
receiving a request from an application installed on the mobile device, the request relating to authorisation of the application to have a cellular network data communications access via a secure profile; and
activating a cellular network data communications session by utilising a secure profile.

13. A method according to clause 12, wherein the method comprises the operating system installing the secure profile on the mobile device.

14. A method according to clause 13, wherein the method comprises the operating system requesting the application install to the secure profile on the mobile device.

15. A method according to any of clauses 12 to 14, wherein the method comprises:
receiving metrics associated with the cellular network data communications session;
storing metrics associated with the cellular network data communications session; and
sending metrics associated with the cellular network data communication session.

16. A method according to any of clauses 12 to 15, wherein the method comprises authorising the application to utilise the cellular network data communications session.

17. A method according to any of clauses 12 to 16, wherein the method comprises sending initial session data to a digital distribution platform.

18. A method according to any of clauses 12 to 17, wherein the method comprises:
ending the cellular network data communications session; and
sending final session data to a digital distribution platform.

19. A mobile device comprising:
memory circuitry arranged to store an operating system and an application; and
processing circuitry which, when configured with the operating system and/or the application, is arranged to perform methods according to any of clauses 1 to 18.

20. A method of operating a cellular network for providing cellular network data communications to a mobile device, the method comprising:
the cellular network receiving a request to establish a cellular network data communications session from a mobile device according to clause 19; and
the cellular network establishing a cellular network data communications session with the mobile device using a secure profile included in the mobile device.

21. A method according to clause 20, wherein establishing the cellular network data communications session comprises determining one or more settings for the cellular network data communications session based at least on the request, and wherein the cellular network data communications session is established according to the one or more settings.

22. A method according to clause 20 or clause 21, wherein establishing the cellular network data communications session comprises determining one or more settings for the cellular network data communications session based at least on configuration data associated with the secure profile, and wherein the cellular network data communications session is established according to the one or more settings.

23. A method according to any of clauses 20 to 21, comprising transmitting cellular network data communications session configuration data for receipt by the mobile device.

24. A method according to any of clauses 20 to 23, comprising:
establishing an accounting session for the cellular network data communication session;
receiving data representing a unique session identification for the cellular network data communications session; and
storing session data associated with the unique session identification for the cellular network data communications session.

25. A method according to clause 24, comprising transmitting session data to a digital distribution platform associated with the application included in the mobile device.

26. A method according to any one of clauses 20 to 25, wherein the method comprises controlling the access to the data session for one or more applications in the mobile device.

27. A method according to clause 26, wherein controlling access to the data session comprises:
receiving data representing an application domain name system, DNS, request and either:
authorizing the mobile device to access a domain name server based on the application DNS request if the application is an authorized application; or
blocking the mobile device from accessing the domain name server based on the application DNS request if the application is not an authorized application.

28. A method according to clause 26 or clause 27, wherein controlling access to the data session comprises:
receiving a request to access an IP address and either:
authorizing the mobile device to access the IP address if the IP address is an authorized IP address; or
blocking the request to access the IP address if the IP address is not an authorized IP address.

29. A cellular network arranged to perform a method according to any of clauses 20 to 28.

What is claimed is:

1. A method of operating a communications-enabled application on a mobile device, the method comprising:
the application detecting a need for data transmission when the mobile device currently has a data communications status which is incompatible with the need, wherein the need is characterized by one or more required parameters of a respective cellular network data communication session; and
the application sending to on operating system (OS) a request to activate a secure profile for the cellular network data communications session, wherein the secure profile is preconfigured on the mobile device and enables the one or more required parameters
wherein sending the request to activate the secure profile starts the cellular network data communications session, and wherein the request is informative of the one or more required parameters related to at least one of: type of data to be transmitted and/or received, volume of data usage, duration of the session, destination address of the session, and accessible services.

2. The method of claim 1, wherein the method comprises generating, by the application, a unique identification for the cellular network data communications session.

3. The method of claim 1, wherein the method comprises: generating, by the application, initial session data based on the one or more required parameters of cellular network data communications session.

4. The method of claim 3, wherein the method comprises sending, by the application, the initial session data to the operating system.

5. The method of claim 4, wherein the method comprises: recording, by the application, metrics associated with the cellular network.

6. The method of claim 5, wherein the method comprises sending, by the application to the OS, a request to deactivate the cellular network data communications session.

7. The method of claim 1, wherein the method comprises: receiving configuration data associated with a tunnelling proxy; and using the configuration data to send data communications during the data session.

8. The method of claim 7, wherein the configuration data comprises credentials for accessing the tunnelling proxy.

9. The method of claim 1, wherein the current data communications status corresponds to another secure profile that is valid whilst does not match the one or more required parameters of the cellular network data communication session.

10. A mobile device comprising: memory circuitry arranged to store an operating system and an application; and processing circuitry which, when configured with the operating system and/or the application, is arranged to perform the method of claim 1.

11. A method of operating a cellular network for providing cellular network data communications to a mobile device, the method comprising: the cellular network receiving a request to establish a cellular network data communications session from a mobile device of claim 10; and the cellular network establishing a cellular network data communications session with the mobile device using the secure profile included activated in the mobile device.

12. The method of claim 11, wherein establishing the cellular network data communications session comprises determining one or more settings for the cellular network data communications session based at least on the request, and wherein the cellular network data communications session is established according to the one or more settings.

13. The method of claim 11, wherein establishing the cellular network data communications session comprises determining one or more settings for the cellular network data communications session based at least on configuration data associated with the secure profile, and wherein the cellular network data communications session is established according to the one or more settings.

14. The method of claim 11, comprising transmitting cellular network data communications session configuration data for receipt by the mobile device.

15. The method of claim 11, comprising: establishing an accounting session for the cellular network data communication session; receiving data representing a unique session identification for the cellular network data communications session; and storing session data associated with the unique session identification for the cellular network data communications session.

16. The method of claim 15, comprising transmitting session data to a digital distribution platform associated with the application included in the mobile device.

17. The method of claim 11, wherein the method comprises controlling the access to the data session for one or more applications in the mobile device.

18. The method of claim 17, wherein controlling access to the data session comprises: receiving data representing an application domain name system, DNS, request and either: authorizing the mobile device to access a domain name server based on the application DNS request if the application is an authorized application; or blocking the mobile device from accessing the domain name server based on the application DNS request if the application is not an authorized application.

19. The method of claim 17, wherein controlling access to the data session comprises: receiving a request to access an IP address and either: authorizing the mobile device to access the IP address if the IP address is an authorized IP address; or blocking the request to access the IP address if the IP address is not an authorized IP address.

20. A cellular network arranged to perform the method of claim 11.

21. A method of controlling a secure profile via an operating system (OS) installed on a mobile device, the method comprising:

receiving by the OS a request from an application installed on the mobile device, the request requiring activating a secure profile to start a cellular network data communications session usable by the application, wherein the request is informative of one or more required parameters of the session; and activating the cellular network data communications session by utilizing a secure profile matching the required parameters of the session and preconfigured on the mobile device, wherein the request is informative of the one or more required parameters related to at least one of: type of data to be transmitted and/or received, volume of data usage, duration of the session, destination address of the session, and accessible services.

22. The method of claim 21, wherein the method comprises: receiving metrics associated with the cellular network data communications session; storing metrics associated with the cellular network data communications session; and sending metrics associated with the cellular network data communication session.

23. The method of claim 21, wherein the method comprises authorizing, by OS, the application to utilize the cellular network data communications session.

24. The method of claim 21, wherein the method comprises sending initial session data to a digital distribution platform.

25. The method of claim 21, wherein the method comprises: ending the cellular network data communications session; and sending final session data to a digital distribution platform.

* * * * *